United States Patent
Croak et al.

(10) Patent No.: US 7,224,773 B2
(45) Date of Patent: May 29, 2007

(54) METHOD AND APPARATUS FOR PROVIDING EMERGENCY CALLS TO A DISABLED ENDPOINT DEVICE

(75) Inventors: Marian Croak, Fair Haven, NJ (US); Hossein Eslambolchi, Los Altos Hills, CA (US)

(73) Assignee: AT&T Corp., New York, NY (US)

( * ) Notice: Subject to any disclaimer, the term of this patent is extended or adjusted under 35 U.S.C. 154(b) by 53 days.

(21) Appl. No.: 11/020,513

(22) Filed: Dec. 23, 2004

(65) Prior Publication Data

US 2006/0140351 A1    Jun. 29, 2006

(51) Int. Cl.
*H04M 11/00*    (2006.01)

(52) U.S. Cl. ............... 379/37; 379/90.01; 379/102.02; 370/352

(58) Field of Classification Search ............ 379/37, 379/93.02, 201.01, 90.01, 102.02; 370/352
See application file for complete search history.

(56) References Cited

U.S. PATENT DOCUMENTS

| | | | |
|---|---|---|---|
| 6,687,348 B2 * | 2/2004 | Cromer et al. ......... | 379/102.04 |
| 6,785,379 B1 * | 8/2004 | Rogers et al. ......... | 379/265.02 |
| 7,027,579 B1 * | 4/2006 | McDonald et al. .... | 379/211.01 |
| 2004/0233892 A1 * | 11/2004 | Roberts et al. ............. | 370/352 |
| 2005/0249023 A1 * | 11/2005 | Bodlaender ................. | 365/232 |

FOREIGN PATENT DOCUMENTS

| | | |
|---|---|---|
| WO | WO 03/058931 A1 | 7/2003 |
| WO | WO 2004/039105 A1 | 5/2004 |

OTHER PUBLICATIONS

EP Search Report of PCT/US2005/046060, Dated Mar. 24, 2006, 3 pages; and 2 references cited therein.

* cited by examiner

*Primary Examiner*—Stella Woo

(57) ABSTRACT

The present invention enables the remote activation of a device by a packet-switched service, e.g., VoIP network service for the purposes of receiving calls identified as urgent from a pre-identified calling party when the device is disabled. The present invention enables registered users to select the calling parties they wish to receive emergency calls from.

13 Claims, 4 Drawing Sheets

METHOD AND APPARATUS FOR PROVIDING EMERGENCY CALLS TO A DISABLED ENDPOINT DEVICE

The present invention relates generally to communication networks and, more particularly, to a method and apparatus enabling emergency calls to reach a disabled endpoint device in packet-switched networks, e.g., Voice over Internet Protocol (VoIP) networks.

BACKGROUND OF THE INVENTION

Users of packet-switched network services, e.g., VoIP network services can turn off their devices that they use to access network services. This capability is extremely convenient for users who are unavailable to answer incoming calls. Occasionally, however, users will need to receive emergency or critical calls even though they desire to be uninterrupted for all other call types.

Therefore, a need exists for a method and apparatus for enabling emergency calls to reach a disabled endpoint device in packet-switched networks, e.g., Voice over Internet Protocol (VoIP) networks.

SUMMARY OF THE INVENTION

In one embodiment, the present invention enables the remote activation of a device by a packet-switched network service, e.g., VoIP network service for the purposes of receiving calls identified as urgent from a pre-identified calling party when the device is disabled. The present invention enables registered users to select the calling parties they wish to receive emergency calls from.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
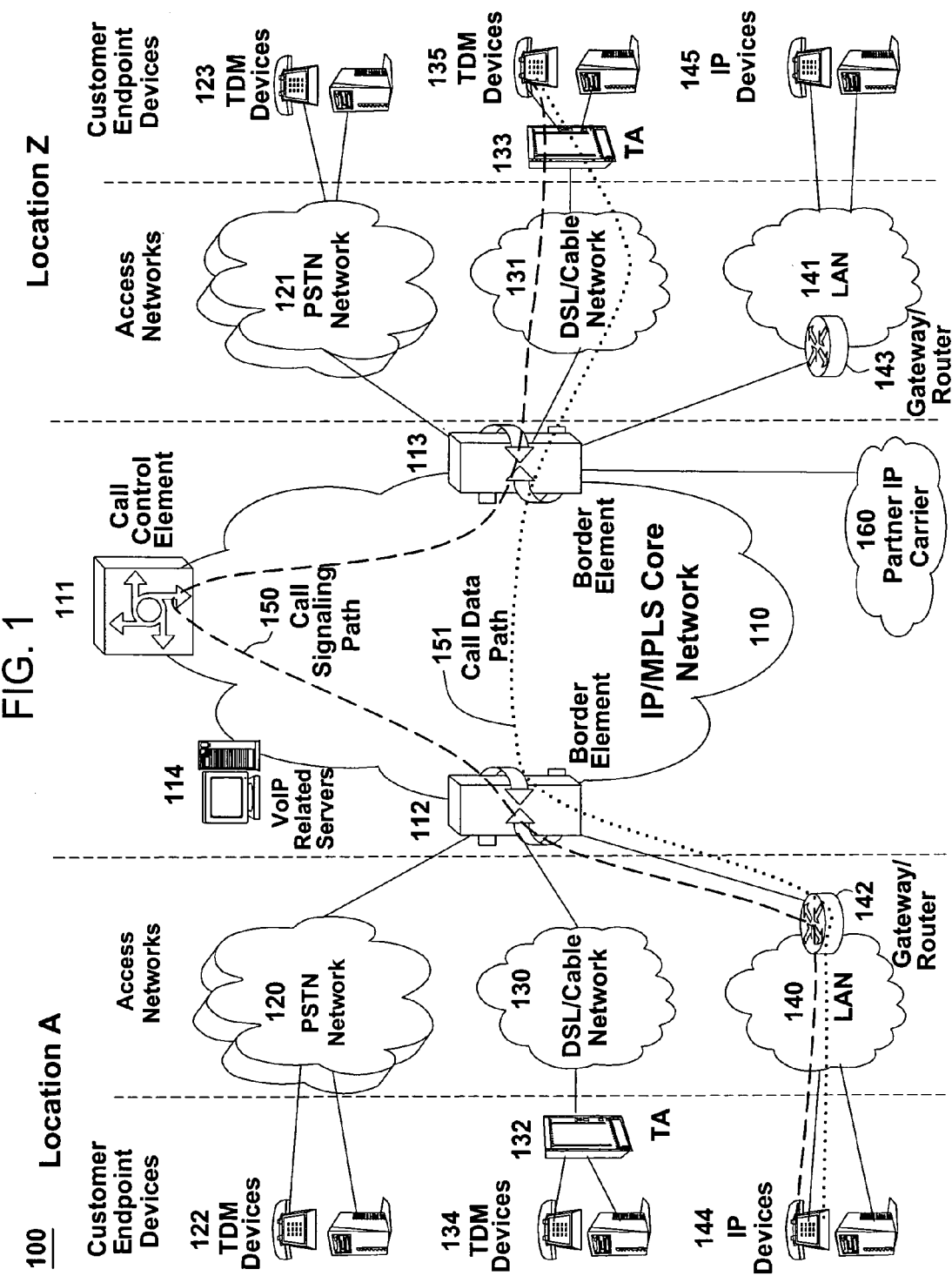
FIG. 1 illustrates an exemplary Voice over Internet Protocol (VoIP) network related to the present invention.

To better understand the present invention, FIG. 1 illustrates an example network, e.g., a packet-switched network such as a VoIP network related to the present invention. The VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. An IP network is broadly defined as a network that uses Internet Protocol to exchange data packets.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Users of packet-switched network services, e.g., VoIP network services, can turn off their devices that they use to access network services. This capability is extremely convenient for users who are unavailable to answer incoming calls. Occasionally, however, users will need to receive emergency or critical calls even though they desire to be uninterrupted for all other call types.

To address this need, the present invention enables the remote activation of a device by a VoIP network service for the purposes of receiving calls identified as urgent from a pre-identified calling party when the device is disabled. The present invention enables registered users to select the calling parties they wish to receive "emergency" calls from.

Returning to FIG. 1, a user using IP endpoint device 144 has subscribed to the emergency calls to disabled endpoint device service feature and has registered endpoint device 144 for the service feature. The user has disabled the device to be uninterrupted, i.e., the disabled device cannot receive or initial calls. This disabled state can be perceived as a standby state or a sleep state, where the endpoint device is consuming very little power. However, the endpoint device 144 supports the emergency calls to disabled endpoint device service feature and can be remotely activated by the network when necessary. The network receives a call from another user using endpoint device 135. CCE 211 checks and finds out that the call destined to endpoint device 144 has subscribed to the emergency calls to disabled endpoint device service feature and the calling endpoint device 135 is on the allowed list of emergency calls or emergency numbers. Therefore, CCE 211 sends a signaling message to endpoint device 144 to enable the device. CCE 211 also sends an alert using the user selected alert mechanism previously chosen by the user. CCE 211 repeats periodically the alert until the user answers and accepts the alert.

Figure 2:
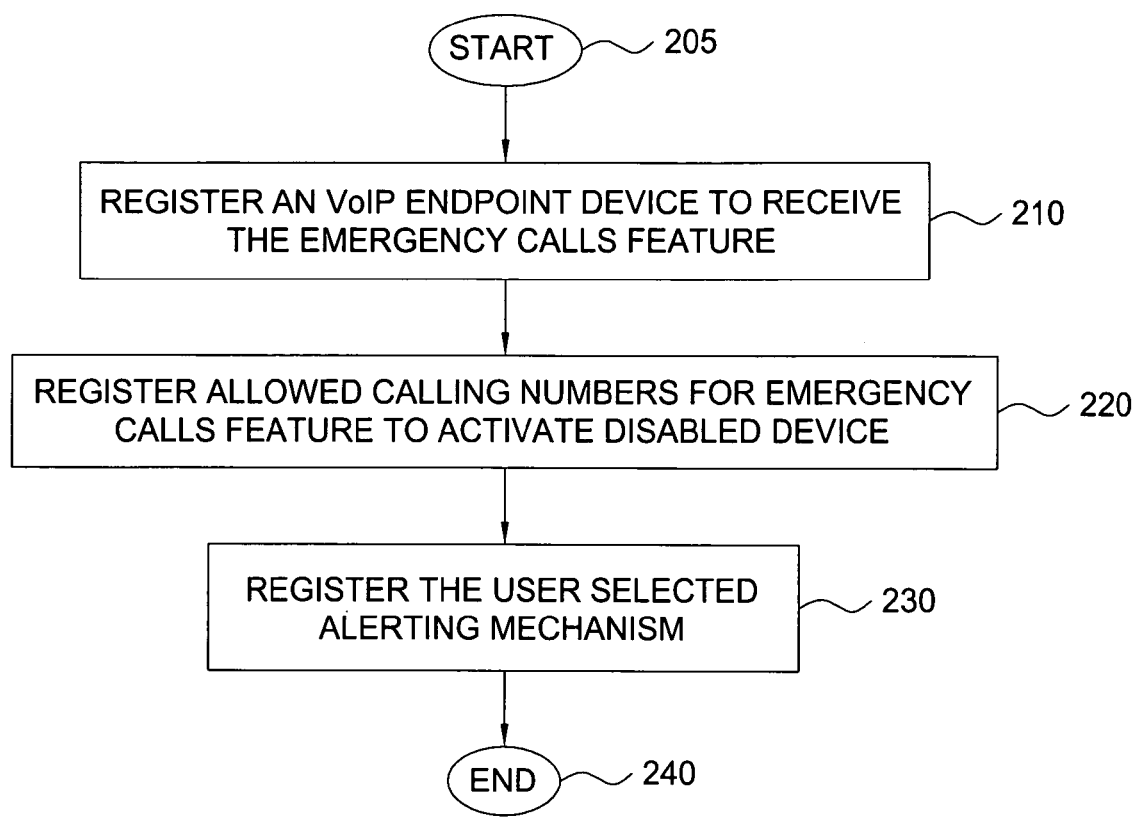
FIG. 2 illustrates a flowchart of a method for registering emergency calls to disabled endpoint device feature in a VoIP network of the present invention.

FIG. 2 illustrates a flowchart of a method for registering emergency calls to disabled endpoint device feature by the packet-switched network, e.g., a VoIP network. Method 200 starts in step 205 and proceeds to step 210.

In step 210, the method registers an IP endpoint device to receive the emergency calls to disabled endpoint device service feature. In step 220, the method registers the allowed list of calling numbers that the network will enable a turned off endpoint device. In step 230, the method registers the user selected alert mechanisms that will be used to alert the user. Alert mechanism options include choices of ring tones, vibrations as well as text messages. The method ends in step 240.

Figure 3:
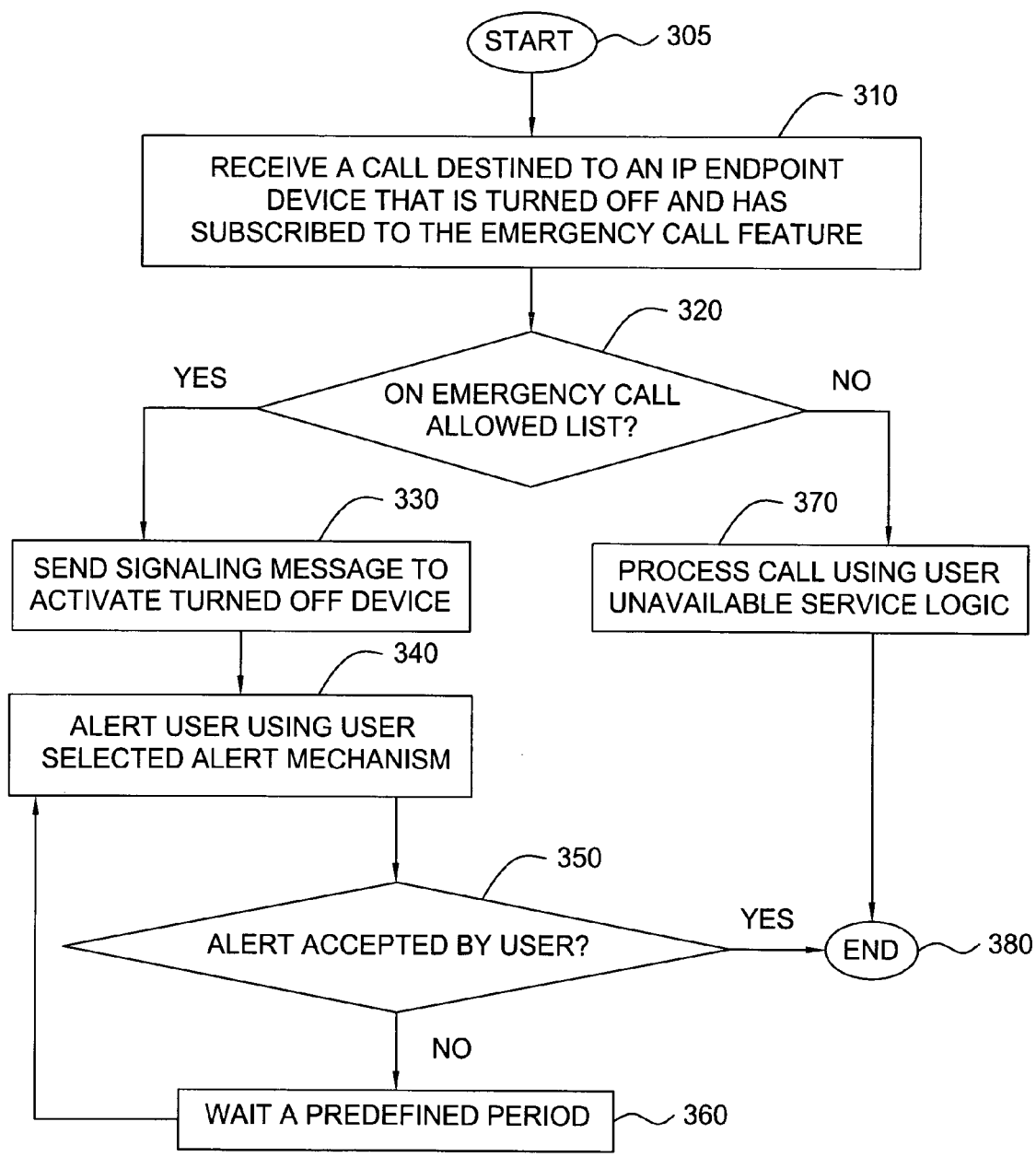
FIG. 3 illustrates a flowchart of a method for enabling emergency calls to disabled endpoint device in a VoIP network of the present invention.

FIG. 3 illustrates a flowchart of a method for enabling emergency calls to disabled endpoint device by the CCE in a packet-switched network, e.g., VoIP network. Method 300 starts in step 305 and proceeds to step 310.

In step 310, the method receives a call destined to a disabled IP endpoint device that has subscribed to the emergency calls to disabled endpoint device service feature. In step 320, the method checks if the calling number is on the allowed emergency calling number list. If the calling number is on the allowed emergency calling number list, the method proceeds to step 330; otherwise, the method proceeds to step 370.

In step 330, the method activates the disabled endpoint device, e.g., causing the endpoint device into an "on" state, where the endpoint device is capable of receiving an incoming call. For example, the method sends a signaling message to the disabled device to remotely enable the endpoint device.

In step 340, once the disabled endpoint device has been activated, the method sends an alert (e.g., an alert message) to the remotely enabled device to alert the user of an incoming emergency call. The form of the alert message is dependent of the capability of the endpoint device, e.g., a type of ringing tone, a vibration, a flashing light indicator, e.g., a LED, a type of color of flashing LED and so on.

In step 350, the method checks if the user has accepted or acknowledged the emergency call alert. Acceptance or acknowledgement of the emergency alert message can be implemented in different manners. Activating the endpoint device to read a text message, activating a button to stop the vibrating feature on the endpoint device, accessing a menu to view "missed calls", retrieving a voice mail from the communication network are some examples of accepting or acknowledging the emergency alert message. If the alert has not been accepted or acknowledged, then the method proceeds to step 360; otherwise, the method proceeds to step 380. In step 360, the method waits a predefined period of time and then proceeds back to step 340. In step 370, the method processes the call using the called party unavailable service logic configured by the user. This includes, but is not limited to, sending the caller to a voicemail or a network announcement message stating the called party is unavailable at the moment. The method ends in step 380.

Note that the endpoint device must support the emergency calls to disabled endpoint device service feature in order to be remotely activated by the network when necessary. For example, the endpoint device may have an off state that resembles a standby state or sleep state with low power consumption, where the endpoint device is technically off. However, under this "semi" or "hybrid" off state, the endpoint device will be unable to receive and/or initiate any calls, except that it can be enabled or activated by a remote signal initiated by the VoIP network.

Figure 4:
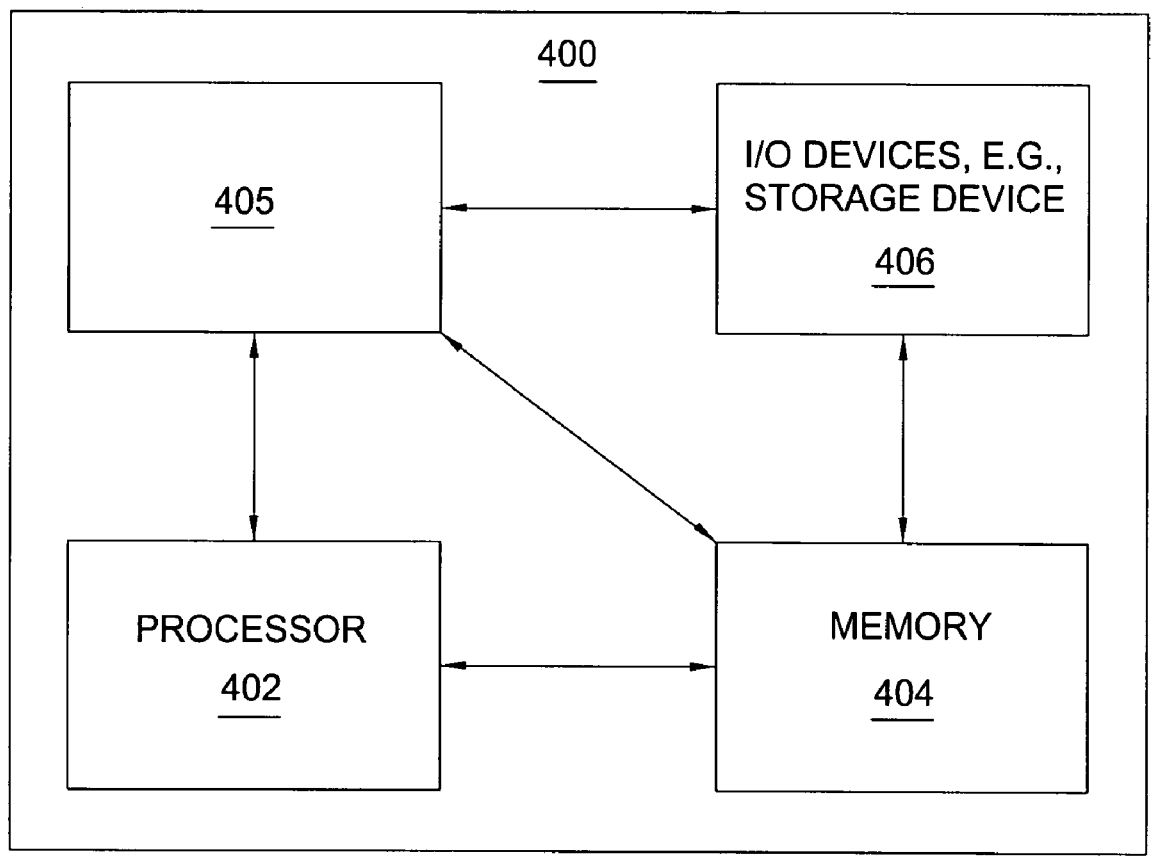
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), an emergency call to disabled IP endpoint device module 405, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present emergency call to disabled IP endpoint device module or process 405 can be loaded into memory 404 and executed by processor 402 to implement the functions as discussed above. As such, the present emergency call to disabled IP endpoint device process 405 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for enabling a disabled endpoint device in a communication network, comprising:
    receiving a call destined to the disabled endpoint device in a disabled state, wherein said disabled endpoint device is incapable of receiving a call or initiating a call in said disabled state;
    determining whether a calling number of said call is on a list of emergency numbers; and
    activating the disabled endpoint device if said calling number is on said list of emergency numbers, wherein said communication network is a Voice over Internet Protocol (VoIP) network.

2. A method for enabling a disabled endpoint device in a communication network, comprising:
    receiving a call destined to the disabled endpoint device in a disabled state, wherein said disabled endpoint device is incapable of receiving a call or initiating a call in said disabled state, wherein said call is received by a call control element (CCE);
    determining whether a calling number of said call is on a list of emergency numbers; and
    activating the disabled endpoint device if said calling number is on said list of emergency numbers.

3. A method for enabling a disabled endpoint device in a communication network, comprising:
    receiving a call destined to the disabled endpoint device in a disabled state, wherein said disabled endpoint device is incapable of receiving a call or initiating a call in said disabled state;
    determining whether a calling number of said call is on a list of emergency numbers;
    activating the disabled endpoint device if said calling number is on said list of emergency numbers; and
    sending an alert message in accordance with an alert option selected by a subscriber of said disabled endpoint device.

4. The method of claim 3, wherein said alert option comprises at least one of: a type of ring tone, a vibration and a text message.

5. The method of claim 3, wherein said sending is performed on a periodic basis until an acknowledgement of said alert message is received.

6. A method for enabling a disabled endpoint device in a communication network, comprising:
    receiving a call destined to the disabled endpoint device in a disabled state, wherein said disabled endpoint device is incapable of receiving a call or initiating a call in said disabled state, wherein said disabled endpoint device is an internet protocol (IP) endpoint device;
    determining whether a calling number of said call is on a list of emergency numbers; and
    activating the disabled endpoint device if said calling number is on said list of emergency numbers.

7. A computer-readable medium having stored thereon a plurality of instructions, the plurality of instructions including instructions which, when executed by a processor, cause the processor to perform the steps of a method for enabling a disabled endpoint device in a communication network, comprising:
    receiving a call destined to the disabled endpoint device in a disabled state, wherein said disabled endpoint device is incapable of receiving a call or initiating a call in said disabled state;
    determining whether a calling number of said call is on a list of emergency numbers; and
    activating the disabled endpoint device if said calling number is on said list of emergency numbers, wherein said communication network is a Voice over Internet Protocol (VoIP) network.

8. A computer-readable medium having stored thereon a plurality of instructions, the plurality of instructions including instructions which, when executed by a processor, cause the processor to perform the steps of a method for enabling a disabled endpoint device in a communication network, comprising;
    receiving a call destined to the disabled endpoint device in a disabled state, wherein said disabled endpoint device is incapable of receiving a call or initiating a call in said disabled state, wherein said call is received by a call control element (CCE);
    determining whether a calling number of said call is on a list of emergency numbers; and
    activating the disabled endpoint device if said calling number is on said list of emergency numbers.

9. A computer-readable medium having stored thereon a plurality of instructions, the plurality of instructions including instructions which, when executed by a processor, cause the processor to perform the steps of a method for enabling a disabled endpoint device in a communication network, comprising:
    receiving a call destined to the disabled endpoint device in a disabled state, wherein said disabled endpoint device is incapable of receiving a call or initiating a call in said disabled state;
    determining whether a calling number of said call is on a list of emergency numbers;
    activating the disabled endpoint device if said calling number is on said list of emergency numbers; and sending an alert message in accordance with an alert option selected by a subscriber of said disabled endpoint device.

10. The computer-readable medium of claim 9, wherein said alert option comprises at least one of: a type of ring tone, a vibration and a text message.

11. The computer-readable medium of claim 9, wherein said sending is performed on a periodic basis until an acknowledgement of said alert message is received.

12. A computer-readable medium having stored thereon a plurality of instructions, the plurality of instructions including instructions which, when executed by a processor, cause the processor to perform the steps of a method for enabling a disabled endpoint device in a communication network, comprising:

receiving a call destined to the disabled endpoint device in a disabled state, wherein said disabled endpoint device is incapable of receiving a call or initiating a call in said disabled state, wherein said disabled endpoint device is an internet protocol (IP) endpoint devices;

determining whether calling number of said call is on a list of emergency numbers; and activating the disabled endpoint device if said calling number is on said list of emergency numbers.

13. A system for enabling a disabled endpoint device in a communication network, comprising:

means for receiving a call destined to the disabled endpoint device in a disabled state, wherein said disabled endpoint device is incapable of receiving a call or initiating a call in said disabled state;

means for determining whether a calling number of said call is on a list of emergency numbers; and means for activating the disabled endpoint device if said calling number is on said list of emergency numbers, wherein said communication network is a Voice over Internet Protocol (VoIP) network.

* * * * *